(12) United States Patent
Adamson

(10) Patent No.: US 6,354,612 B1
(45) Date of Patent: Mar. 12, 2002

(54) SHOPPING CART HAVING SELECTIVELY POSITIONABLE TRAY BASKET

(75) Inventor: Mark Adamson, Broken Arrow, OK (US)

(73) Assignee: Unarco Industries, Inc., Wagoner, OK (US)

( * ) Notice: Subject to any disclaimer, the term of this patent is extended or adjusted under 35 U.S.C. 154(b) by 0 days.

(21) Appl. No.: 08/843,777

(22) Filed: Apr. 21, 1997

(51) Int. Cl.[7] .............................. B62D 39/00; A47F 3/14
(52) U.S. Cl. .............................. 280/33.992; 280/47.35; 211/126.6; 211/132.1
(58) Field of Search ..................... 280/33.991, 33.992, 280/33.993, 33.996, 47.35, 79.2, 79.3; 108/44; 211/85, 149, 126.6, 132.1, 150

(56) References Cited

U.S. PATENT DOCUMENTS

| | | | | |
|---|---|---|---|---|
| 2,042,517 A | * | 6/1936 | Ellis | 211/93 |
| 2,662,661 A | * | 12/1953 | Goldamn | 280/33.992 |
| 3,043,440 A | * | 7/1962 | Berlin | 211/90 |
| 3,269,556 A | * | 8/1966 | Streater | 211/90 |
| 3,295,471 A | * | 1/1967 | Cook | 211/93 |
| 3,375,018 A | * | 3/1968 | Close | 280/33.992 |
| 3,534,973 A | * | 10/1970 | Elliot | 280/33.99 |
| 3,774,929 A | * | 11/1973 | Stanley | 280/33.992 |
| 5,002,292 A | * | 3/1991 | Myers | 280/33.992 |
| 5,265,893 A | * | 11/1993 | Ettlin | 280/33.992 |
| 5,385,358 A | * | 1/1995 | Adamson | 280/33.995 |
| 5,505,318 A | * | 4/1996 | Golf | 211/90 |
| 5,542,687 A | * | 8/1996 | Harris | 280/33.993 |
| 5,730,066 A | * | 3/1998 | Auten | 108/44 |
| 5,836,596 A | * | 11/1998 | Wanzl | 280/33.991 |
| 5,961,133 A | * | 10/1999 | Perry | 280/33.993 |
| 6,056,178 A | * | 5/2000 | Rapp-Duncan | 280/33.992 |

OTHER PUBLICATIONS

Illustration of tray–basket structure, dated 1992, admitted prior art.

* cited by examiner

Primary Examiner—Lanna Mai
Assistant Examiner—Jeff Restifo
(74) Attorney, Agent, or Firm—Rockey, Milnamow & Katz, Ltd.

(57) ABSTRACT

In a shopping cart, in which a basket is supported by a chassis, a tray is hinged within the basket so as to enable the tray to be selectively positionable in a generally horizontal, usage position or in a generally vertical, storage position. In a preferred embodiment, a hinge wire is located at what becomes an upper end of each hinge aperture in the storage position, in which the tray does not extend above the front wall of the basket. The tray is arranged so that it is necessary to move the tray so as to space the upper end of each hinge aperture from the hinge wire sufficiently to avoid interference between the tray and the front wall of the basket when repositioning the tray from the storage position into the usage position. Each side wall of the basket has a support projecting into the basket and adapted to engage the tray with the tray resting on the supports so as to stabilize the tray when positioned in the usage position. The tray is arranged to lean against the front wall of the basket in the storage position. In an alternative embodiment, the tray is foldable along an axis parallel to the front wall of the basket.

8 Claims, 4 Drawing Sheets

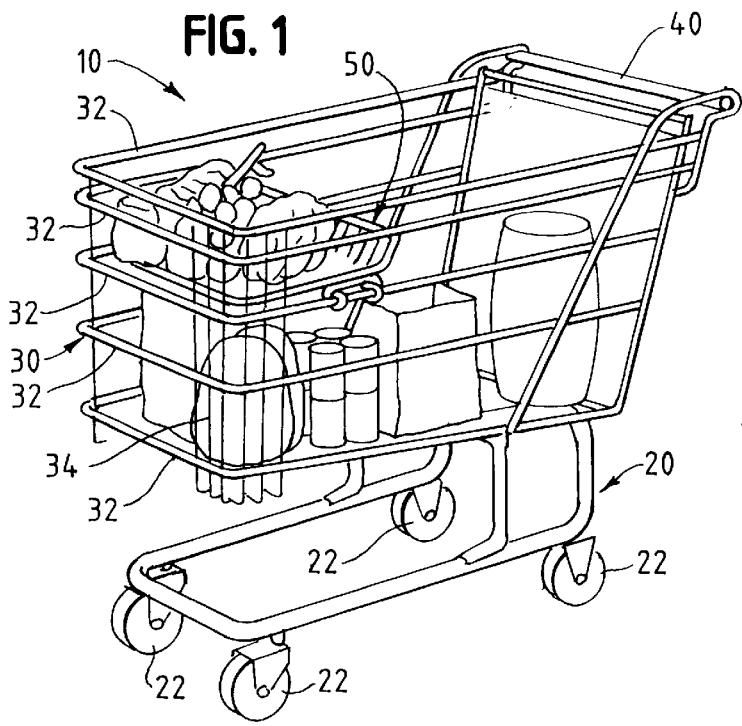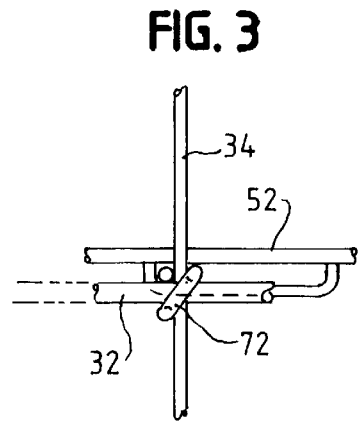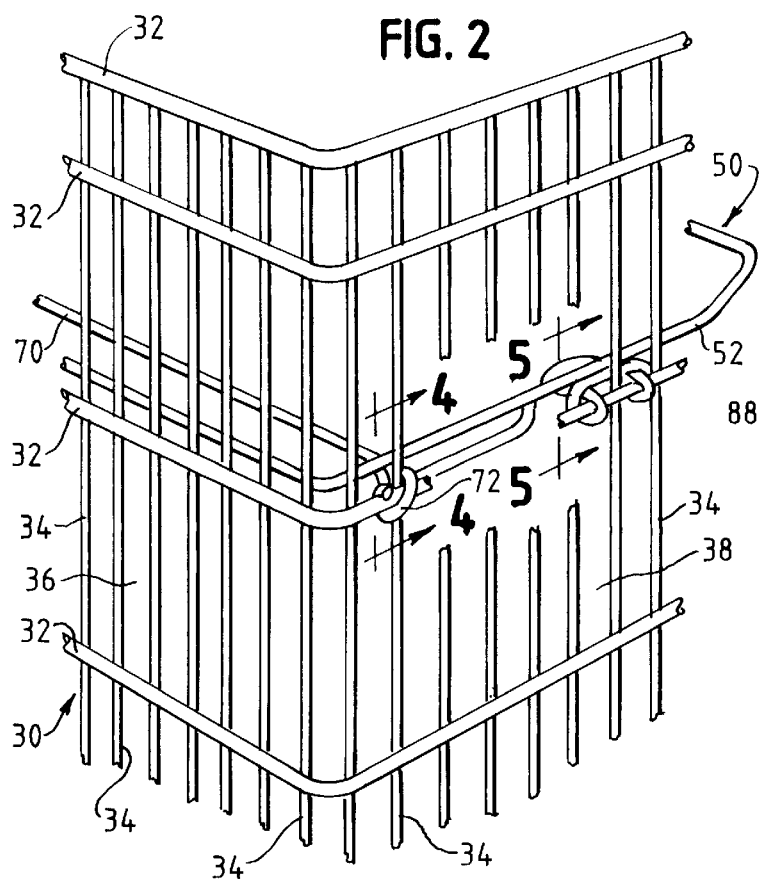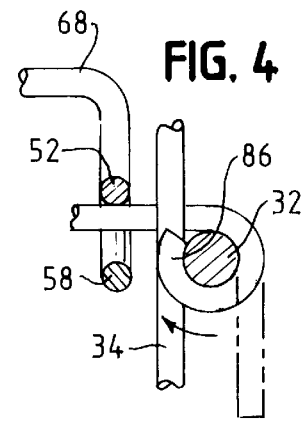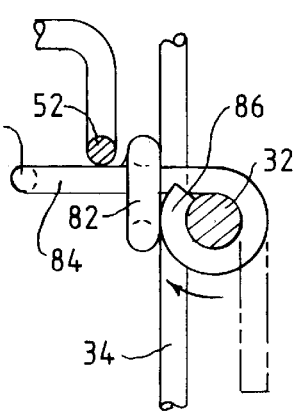

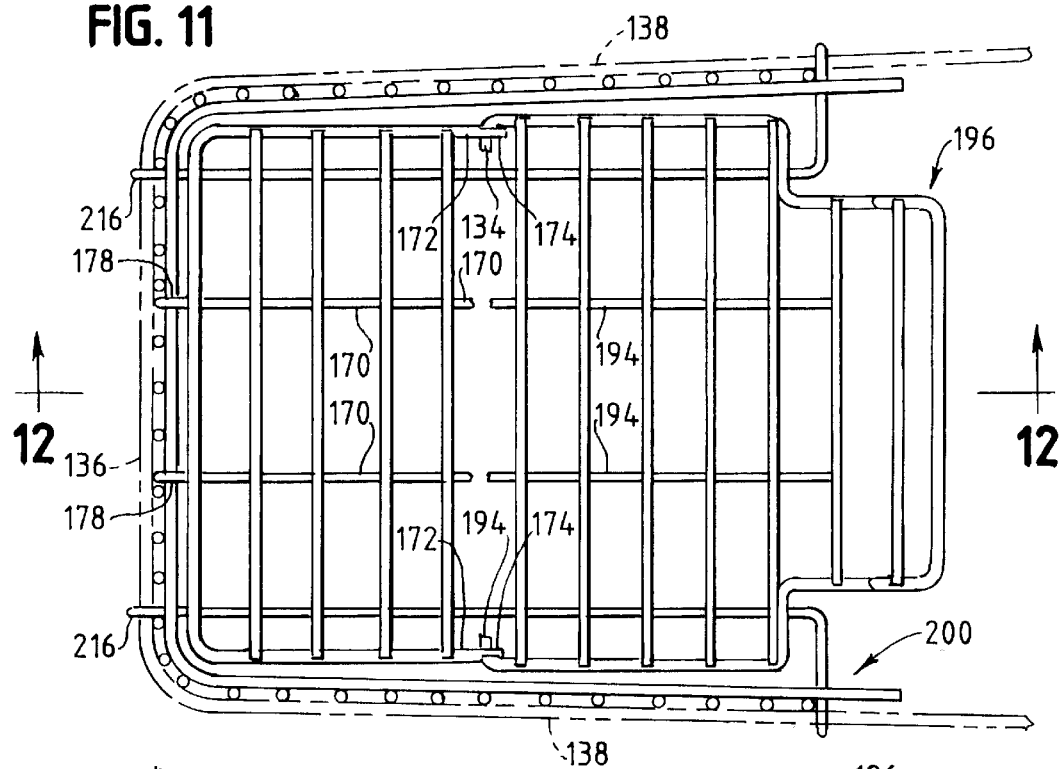
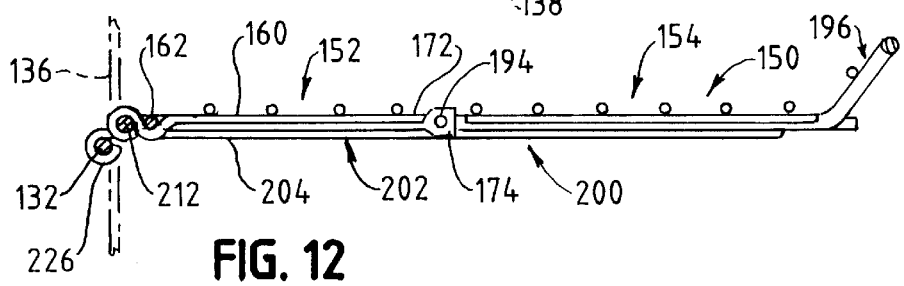
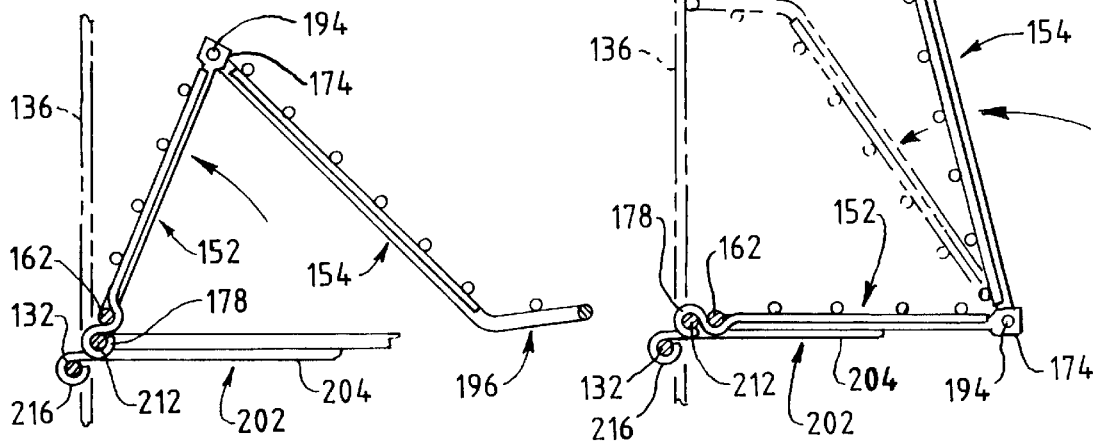
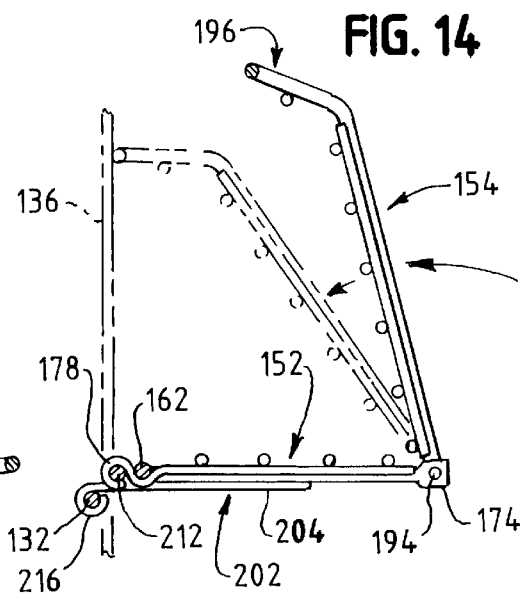

SHOPPING CART HAVING SELECTIVELY POSITIONABLE TRAY BASKET

TECHNICAL FIELD OF THE INVENTION

This invention pertains to a shopping cart comprising a chassis, a basket supported by the chassis, and, as provided by this invention, a tray that can be selectively positioned within the basket selectively in a usage position or in a storage position. In the usage position, the tray can be advantageously used to hold fragile items, such as eggs, produce, or bakery goods.

BACKGROUND OF THE INVENTION

A shopping cart of a type in widespread use in grocery stores and other retail establishments comprises a chassis, which has casters, and a basket, which is supported by the chassis. Conventionally, the basket is made from welded steel wires. Alternatively, the basket is made from molded plastic panels. Commonly, the basket is nestable into the basket of a similar cart. The basket may have a child seat. Additionally, the shopping cart may have a tray fixed to the chassis, below the basket.

When fragile items, such as eggs, produce, or bakery goods, are placed by a shopper into the basket, they are susceptible to damage caused by hard, large, or heavy items that may be later placed into the basket. A shopper may decide to place fragile items into a child seat, if one is provided and is not occupied by a child, or onto a tray below the basket, if one is provided. Commonly, however, neither a child seat nor a tray below the basket is available to receive fragile items that a shopper wants to protect against damage.

SUMMARY OF THE INVENTION

This invention provides, in a shopping cart comprising a chassis and a basket supported by the chassis and having a front wall and two side walls, a tray adapted to fit within the basket selectively in a usage position or in a storage position. The tray may be broadly characterized as hinged to the basket so as to enable the tray to be selectively positionable selectively in the usage position or in the storage position.

In a preferred embodiment, a hinge wire is mounted to the basket so as to extend across the basket, between the side walls, and extends through a hinge aperture of the tray so as to enable the tray to be selectively positionable selectively in the usage position or in the storage position.

Preferably, the hinge aperture is elongate and has two opposite ends, which become an upper end and a lower end respectively when the tray is positioned in the storage position when the tray is positioned in the usage position. The hinge wire is located at the upper end of the hinge aperture when the tray is positioned in the storage position. The tray rests against but does not extend above the front wall of the basket in the storage position.

Preferably, moreover, the hinge wire is spaced from the front wall of the basket by a given distance and the tray is arranged to extend below the hinge wire by a greater distance when the tray is positioned in the storage position. Consequently, when repositioning the tray from the storage position into the usage position, it is necessary to move the tray so as to displace the upper end of the hinge aperture from the hinge wire sufficiently to avoid interference between the tray and the front wall of the basket.

Preferably, the basket has a support projecting into the basket and adapted to engage the tray so as to stabilize the tray when positioned in the usage position, in which the tray is generally horizontal, and the tray is adapted to lean against the front wall of the basket when positioned in the storage position. Preferably, at least one of the front and side walls of the basket may have such a support. More preferably, at least one of the side walls of the basket has such a support, on which the tray rests when positioned in the usage position. Most preferably, each side wall of the basket has such a support, on which the tray rests when positioned in the usage position.

Desirably, the hinge aperture is one of two spaced apertures, which are similar to each other and which are spaced laterally from each other. Desirably, the tray is formed from welded steel wires, which include two elongate loops, each defining one of the hinge apertures.

In an alternative embodiment, the tray is foldable in either of the usage and storage positions, along an axis parallel to the front wall. The tray may be then hinged at the front wall of the basket so as to be selectively positionable in the usage position or in the storage position.

In the alternative embodiment, the basket may have at least one support, which supports the tray in the usage position. Preferably, the basket has two supports, one at each side wall, which support the tray in the usage position.

These and other objects, features, and advantages of this invention are evident from the following description of the preferred embodiment of this invention, with reference to the accompanying drawings.

BRIEF DESCRIPTION OF THE DRAWINGS

FIG. 1 is a perspective view of a shopping cart comprising a chassis, a basket with two supports, and a tray and constituting the preferred embodiment of this invention. Many vertical wires of the basket have been omitted so as to simplify the view. Exemplary produce and other items are shown in the basket.

FIG. 2 is a greatly enlarged, fragmentary detail of one front corner of the basket, as shown in FIG. 1.

FIG. 3 is a similarly enlarged, fragmentary detail of one end of a hinge wire and adjacent wires, as shown in FIG. 2.

FIGS. 4 and 5 are further enlarged, sectional views taken along line 4–4 and line 5–5 respectively in FIG. 2, in the directions indicated by arrows.

FIG. 11 is a fragmentary, top plan of the basket after the tray and the supporting structure have been installed.

FIG. 12 is a fragmentary, sectional view taken along line 12—12 of FIG. 11, in a direction indicated by arrows.

FIGS. 13 and 14 are similar, sectional views showing two folded, storage positions of the tray.

DETAILED DESCRIPTION OF THE PREFERRED EMBODIMENT

Figure 6:
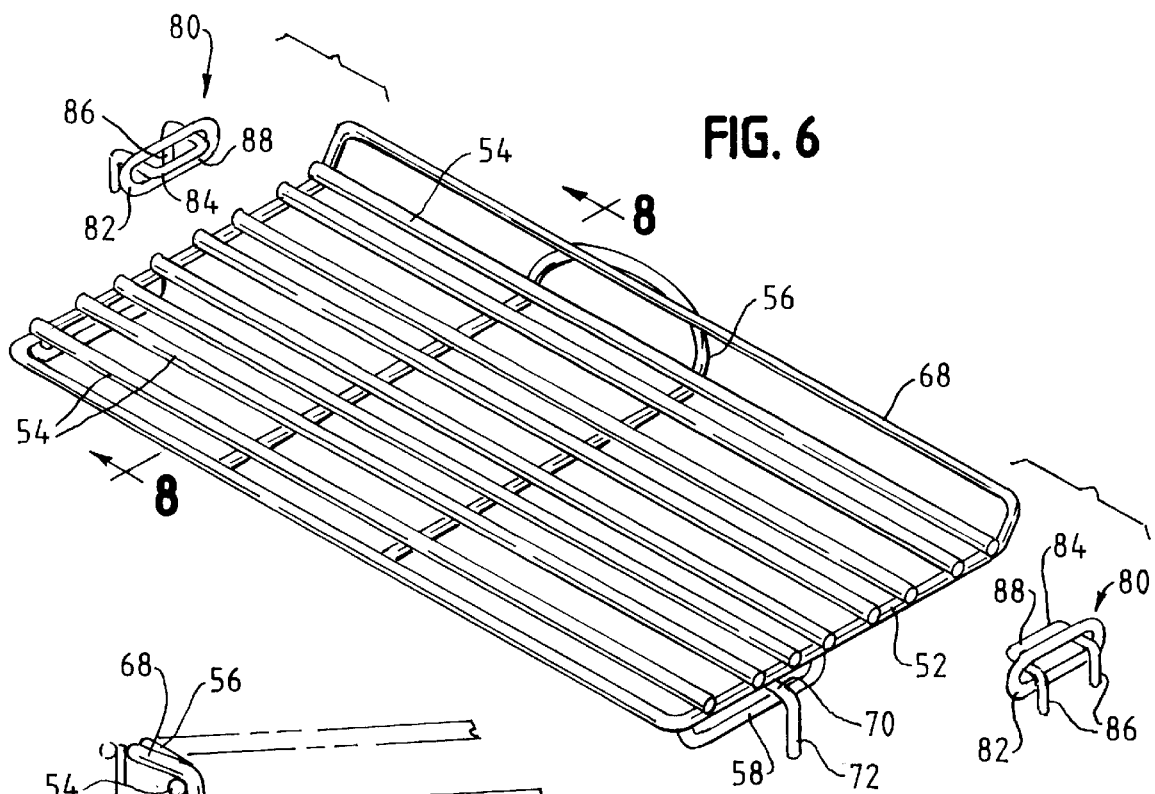
FIG. 6 is an exploded, perspective view of the tray and the supports, as shown before their installation on the basket, which is not shown.

As shown in FIG. 1, a shopping cart 10 constituting a preferred embodiment of this invention comprises a chassis 20, which includes casters 22, and a basket 30, which is supported by the chassis 20 and which mounts a handle 40. The basket 30 may comprise a child seat (not shown) of a known type. As contemplated by this invention, the shopping cart 10 further comprises a tray 50, which can be selectively positioned in a generally horizontal, usage position (see FIGS. 1, 2, and 8) within the basket 30 or in a generally vertical, storage position (see FIG. 7) within the basket 30.

The chassis 20 and the handle 40 are conventional and do not need to be further described. The basket 30, which also is conventional, is made from welded steel wires which include five wires 32 of a heavier gauge and numerous wires 34 of a lighter gauge and which define a front wall 36 of the basket 30, two side walls 38 of the basket 30, and a bottom wall (not shown) of the basket 30. The heavier gauge wires 32 are formed conventionally and are oriented so that their centerlines lie in generally horizontal planes. The lighter gauge wires 34 are formed conventionally so that their centerlines have generally vertical sections and generally horizontal sections.

As shown in FIG. 6, the tray 50 is made from welded steel wires, namely a frame wire 52, which is welded at a joint (not shown) into an endless loop, plural cross wires 54, which are welded at their ends to the frame wire 52, and a bracing wire 56, which is welded to the frame wire 52 and to the cross wires 54. Two wire segments 58 are welded to the frame wire 52, one wire segment 58 at each side of the tray 50. Each wire segment 58 defines a hinge aperture 60, which is elongate with two opposite ends, namely an end 62 that becomes an upper end when the tray 50 is positioned in the storage position and an end 64 that becomes a lower end when the tray 50 is positioned in the storage position. The end 62 becomes the end nearer to the front wall 36 of the basket 30 and the end 64 becomes the end farther from the front wall 36 thereof when the tray 50 is positioned in the usage position. One end portion 68 of the frame wire 52, namely the end portion that is uppermost in the storage position of the tray 50, is bent so as to project upwardly and backwardly (toward the handle 40) in the usage position of the tray 50.

Rather than the basket 30 made from welded steel wires, a basket (not shown) having molded plastic panels may be alternatively used, as exemplified by the basket disclosed in U.S. Pat. No. 5,255,930. Rather than the tray 50 made from welded steel wires, a molded plastic tray (not shown) may be alternatively used, whichever basket is used.

A hinge wire 70 having two opposite ends 72 is mounted to the basket 30 so as to extend across the basket 30, between the side walls 38, by crimping each of the opposite ends 72 simultaneously around a selected one of the heavier gauge wires 32 and around a selected one of the lighter gauge wires 34 where the selected one of the heavier gauge wires 32 crosses the selected one of the lighter gauge wires 34, at a respective one of the side walls 38, as shown in FIG. 3. If a basket having molded plastic panels is used, as discussed above, each of the opposite ends of the hinge wire is secured suitably to a respective one of the plastic panels defining the side walls of the basket.

Figure 7:
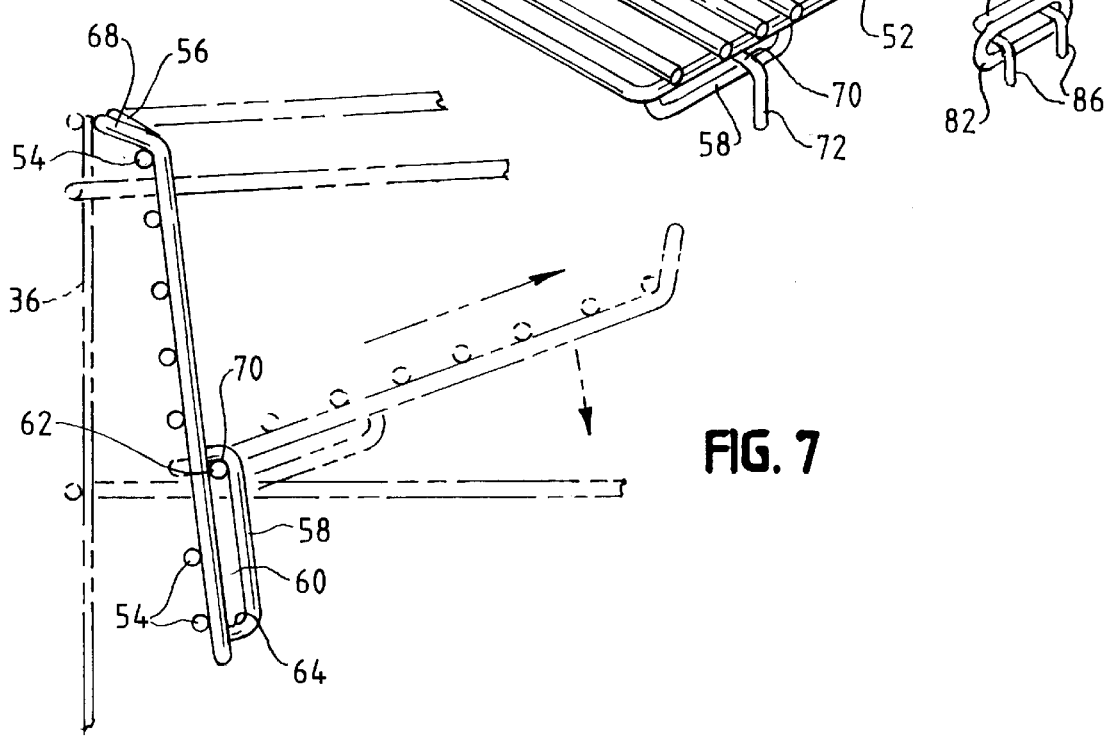
FIG. 7 is a schematic view showing the tray being repositioned from a storage position toward a usage position and showing certain wires of the basket in broken lines.

The hinge wire 70 extends through the hinge apertures 60 so as to enable the tray 50 to be selectively positionable in the usage position or in the storage position. As shown in FIG. 7, the hinge wire 70 is located at the upper end 62 of each hinge aperture 60 when the tray 50 is positioned in the storage position. The tray 50 is adapted, through its configuration and its coaction with the hinge wire 70, to lean against but not to extend above the front wall 36 of the basket 30 when the tray 50 is positioned in the storage position. Consequently, the tray 50 does not interfere with nesting of the basket 30 of the shopping cart 10 into the basket of a similar cart (not shown) when the tray 50 is positioned in the storage position. Moreover, the tray 50 does not interfere therewith when the tray 50 is positioned in the usage position.

As shown in FIG. 7, the hinge wire 70 is spaced from the front wall 36 of the basket 30 by a given distance, whereas the tray 50 is configured so as to extend below the hinge wire 70 by a greater distance when the tray SO is positioned in the storage position. Consequently, it is necessary to move the tray 70 so as to displace the upper ends 62 of the hinge apertures 60 from the hinge wire 70, thereby to avoid interference between the tray 50 and the front wall 36 of the basket 30, when repositioning the tray 70 from the storage position into the usage position.

Two supports 80 are provided, each being mounted to an associated one of the side walls 38 of the basket 30. Each support 80 is made from two welded wires, namely a wire 82 formed and welded at a joint (not shown) into a endless loop and a wire 84 formed into two legs 86 and a bight 88. Each support 80 is installed so that the bight 88 of the wire 84 of support 80 extends through the endless loop formed by the wire 82 of such support 80, so that the endless loop formed thereby is positioned within the basket 30 and bears against a selected two of the lighter gauge wires 34 of the associated wall 38, and so that the legs 86 are crimped around a selected one of the heavier gauge wires 32 of the associated wall 38, between the selected wires 34. The endless loop formed by the wire 82 is wider than spacing between the selected wires 34. The crimped legs 86 may be also called knuckles.

Figure 8:
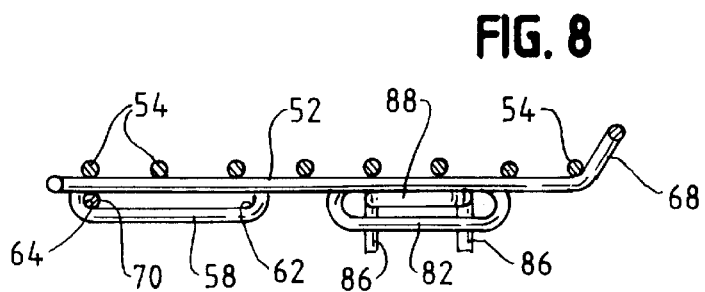
FIG. 8 is a sectional view showing the tray and one support after their installation on the basket, which is not shown, and with the tray in the usage position, as taken along line 8—8 of FIG. 6, in a direction indicated by arrows.

The supports 80 are mounted to the side walls 38 of the basket 30 so that the frame wire 52 of the tray 50 can rest on the bights 88 of the supports 80, as shown in FIG. 8, when the tray 50 is positioned in the usage position. Furthermore, when the tray 50 is positioned in the usage position, the tray 50 can slide frontwardly and backwardly along the hinge wire 70, while remaining supported on the hinge wire 70 and on the supports 80, within a frontward limit imposed by the front wall 36 of the basket 30 and a backward limit imposed by the wire segments 58 at the nearer ends 62 of the hinge apertures 60.

Figure 9:
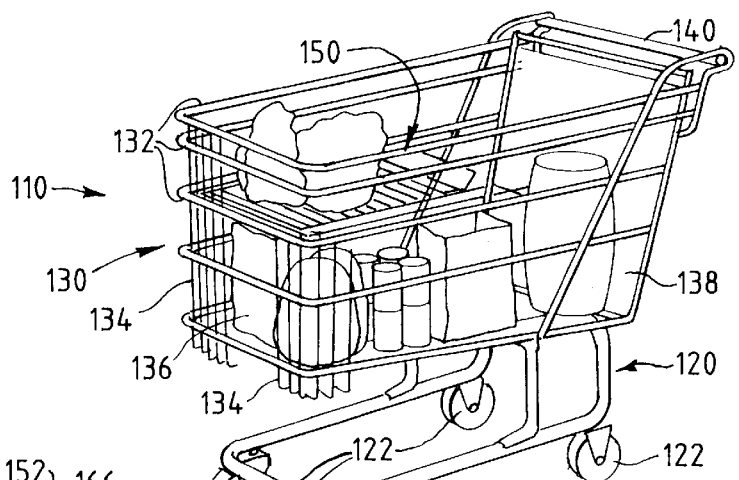
FIG. 9 is a perspective view of a shopping cart comprising a chassis, a basket with two supports, and a tray and constituting the preferred embodiment of this invention. Many vertical wires of the basket have been omitted so as to simplify the view. Exemplary produce and other items are shown in the basket.

As shown in FIG. 9, a shopping cart 110 constituting an alternative embodiment of this invention comprises a chassis 120, which includes casters 122, and a basket 130, which is supported by the chassis 120 and which mounts a handle 140. The basket 130 may comprise a child seat (not shown) of a known type. As contemplated by this invention, the shopping cart 10 further comprises a tray 150, which can be selectively positioned in a generally horizontal, usage position (see FIGS. 10, 11, and 12) within the basket 130, or in a first, folded, storage position (see FIG. 13) within the basket 30, or in a second, folded, storage position (see FIG. 14) within the basket 130.

The chassis 120, the basket 130, and the handle 140 are similar to the chassis 20, basket 30, and the handle 40 of the preferred embodiment. The basket 130 thus is made from welded steel wires which include five wires 132 of a heavier gauge and numerous wires 134 of a lighter gauge and which define a front wall 136 of the basket 130, two side walls 138 of the basket 130, and a bottom wall (not shown) of the basket 130. The heavier gauge wires 132 are formed conventionally and are oriented so that their centerlines lie in generally horizontal planes. The lighter gauge wires 134 are formed conventionally so that their centerlines have generally vertical portions and generally horizontal portions.

As shown in FIGS. 10 through 13, the tray 150 comprises a front panel 152, which is hinged to the basket 130 at the front wall 136 and a back panel 154, which is hinged to the front panel 152. The front panel 152 and the back panel 154 are made from welded steel wires. The terms "front" and "back" refer to the tray panels 152, 154, in the usage position of the tray 150.

Thus, the front panel 152 is made from a frame wire 160, which is bent so as to have a front section 162 and two side sections 164, four cross wires 166, which are welded at their ends 168 to the side sections 164 of the frame wire 162, and two bracing wires 170, which are welded to the front section 162 of the frame wire 162 where the bracing wires 170 cross the front section 162 of the frame wire 162 and to the cross wires 166 where the bracing wires 170 cross the cross wires 166. At each back end 172 of the frame wire 160, a tab 174 is formed, which projects backwardly and which has a hinge aperture 176. The hinge apertures 176 are circular. A front end 178 of each bracing wire 168 projects beyond the frame wire 162 for a purpose to be later described.

Also, the back panel 154 is made from a frame wire 180, which is bent so as to have a back section 182 and two side sections 184, five comparatively longer cross wires 186, which are welded at their ends 188 to the side sections 184, two comparatively shorter cross wires 190, which are welded at their ends 192 to the side sections 184, and two bracing wires 194, which are welded to the comparatively longer cross wires 186. The frame wire 180 is bent so that a back portion 196 of the back panel 154 is narrower, as compared to a front portion 194 of the back panel 154, and so that the back portion 196 projects upwardly and backwardly (toward the handle 150) in the usage position of the tray 150. The back portion 196 includes the two comparatively shorter cross wires 190.

Projecting frontwardly beyond the frontmost cross wire 186, each front end 198 of the frame wire 180 of the back panel 154 is bent inwardly and projects through the hinge aperture 176 of the tab 174 of an associated one of the back ends 172 of the frame wire 160 of the front panel 152, so as to hinge the back panel 154 to the front panel 152. After one such end 198 of the frame wire 180 has been inserted into the hinge aperture 176 of one such end 172 of the frame wire 160, the back ends 172 of the frame wire 160 have sufficient resiliency (from the frame wire 160 being a steel wire) to permit the other end 198 of the frame wire 180 to be forcibly snapped into the hinge aperture 176 of the other end 172 of the frame wire 160. Thus, as shown in FIGS. 13 and 14, the tray 150 is foldable about an axis parallel to the front wall 136 of the basket 130. The axis is defined by the hinge apertures 176 of the tabs 174 formed on the back ends 172 of the frame wire 160 of the front panel 152 and by the front ends 198 of the frame wire 180 of the back panel 154.

Figure 10:
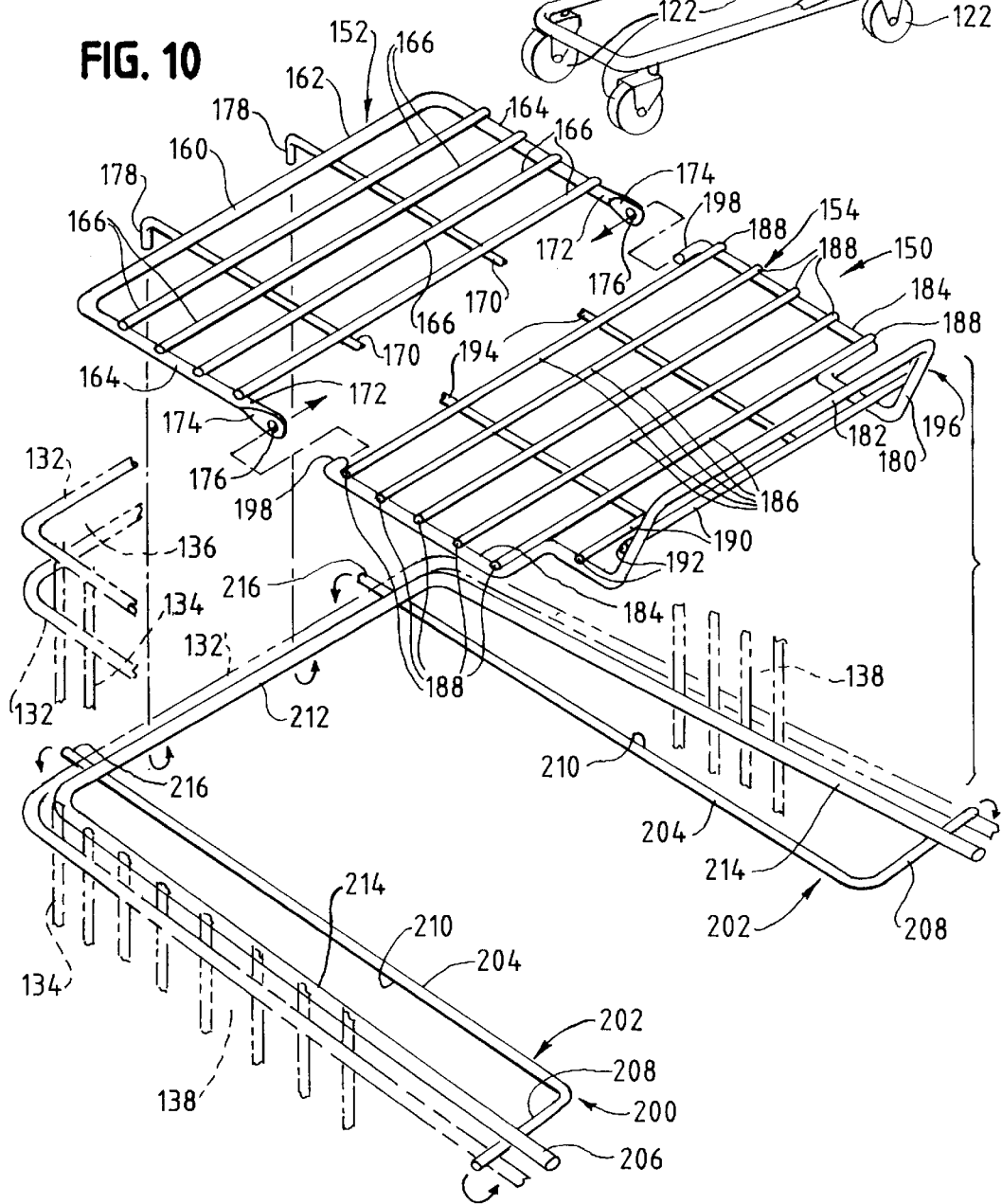
FIG. 10 is an exploded, perspective view of the tray and a supporting structure, as shown before the tray is assembled and before the tray and the supporting structure are installed within the basket, which is shown in broken lines.

As shown in FIGS. 10, 11, and 12, a supporting structure 200 defining a support 202 for the tray 150 at each side wall 138 of the basket 130 is made from welded steel wires, namely two side wires 204 and a peripheral wire 206, which is welded to the side wires 204. Each side wire 204 is bent so as to have a comparatively shorter, laterally extending section 208 and a comparatively longer, longitudinally extending section 210. Being formed so as to conform generally to the basket walls 136, 138, and to fit loosely into the basket 130, the peripheral wire 206 has a front section 212 at the front wall 136 of the basket 130 and two side sections 214, each at one of the side walls 138 of the basket 130. The peripheral wire 206 is welded to each side wire 204 at its laterally extending section 208 and at its longitudinally extending section 210.

As shown in FIGS. 9, 10, and 11, the supporting structure 200 is mounted within the basket 130 so that a front end 216 of the longitudinally extending section 210 of each side wire 204 projects through the front wall 132 of the basket 130, between vertically extending sections of two lighter gauge wires 134, and is crimped around a selected one of the heavier gauge wires 132, and so that an outer end 218 of the laterally extending section 208 of each side wire 208 projects through an associated one of the side walls 138 of the basket 130, between vertically extending sections of two lighter gauge wires 134, and is crimped around the selected one of the heavier gauge wires 132. The crimped ends 216, 218, may be also called knuckles.

The front end 178 of each bracing wire 168 projects beyond the frame wire 162, as discussed above, and is crimped around the front section 212 of the peripheral wire 206, at the front wall 132 of the basket 130, so as to hinge the front panel 152 to the front wall 132. The crimped ends 178 may be also called knuckles.

As shown in FIG. 12, the supports 202 defined by the supporting structure 200 support the front panel 152 of the tray 150 and the back panel 154 thereof in the usage position of the tray 150. When the tray 150 is folded into the first, folded, storage position, as shown in FIG. 13, the front panel 152 is pivoted upwardly and frontwardly, whereupon the back panel 154 is folded downwardly and frontwardly. Moreover, the supports 202 support the back portion 196 of the back panel 154 in the first, folded, storage position of the tray 150. When the tray 150 is folded into the second, folded, storage position, as shown in FIG. 14, the back panel 154 is folded upwardly and frontwardly, while the supports 202 continue to support the front panel 152 of the tray 150.

Preferably, the tray 150 is arranged so as not to project above the front wall 136 of the basket 130 when the tray 150 is folded into the first or second, folded, storage position. Consequently, the tray 150 does not interfere with nesting of the basket 130 of the shopping cart 110 into the basket of a similar cart (not shown) when the tray 150 is positioned in either storage position. Moreover, the tray 150 does not interfere therewith when the tray 150 is positioned in the usage position.

In each of the preferred and alternative embodiments illustrated in the drawings and described above, the tray is positioned near the front wall of the basket, away from the back edges of the side walls of the basket, in either of the usage and storage and usage positions of the tray.

Various modifications may be made in the preferred and alternative embodiments illustrated in the drawings and described above without departing from the scope and spirit of this invention.

What is claimed is:

1. A shopping cart comprising a chassis, a basket supported by the chassis, the basket having a front wall and two side walls, a tray adapted to fit within the basket selectively in a usage position or in a storage position, the tray having a hinge aperture, and a hinge wire mounted to the basket so as to extend across the basket, between the side walls, the hinge wire extending through the hinge aperture so as to enable the tray to be selectively positionable in the usage position or in the storage position, the hinge aperture being elongate and having two opposite ends, which become an upper end and a lower end respectively when the tray is positioned in the storage position, the hinge wire being located at the upper end of the hinge aperture when the tray is positioned in the storage position, in which the tray rests against but does not extend above the front wall of the basket.

2. The shopping cart of claim 1 wherein the hinge wire is spaced from the front wall of the basket by a given distance and the tray is arranged so as to extend below the hinge wire by a greater distance when the tray is positioned in the storage position, whereupon it is necessary to move the tray so as to displace the upper end of the hinge aperture from the hinge wire sufficiently to avoid interference between the tray and the front wall of the basket when repositioning the tray from the storage position into the usage position.

3. The shopping cart of claim 1 wherein the basket has a support projecting into the basket and adapted to engage the tray so as to stabilize the tray when positioned in the usage position, in which the tray is generally horizontal, the tray being adapted to lean against the front wall of the basket when positioned in the storage position.

4. The shopping cart of claim 1 wherein at least one of the front and side walls of the basket has a support projecting into the basket and adapted to engage the tray so as to stabilize the tray when positioned in the usage position, in which the tray is generally horizontal, the tray being adapted to lean against the front wall of the basket when positioned in the storage position.

5. The shopping cart of claim 1 wherein at least one of the side walls of the basket has a support projecting into the basket and adapted to engage the tray with the tray resting on the support so as to stabilize the tray when positioned in the usage position.

6. The shopping cart of claim 1 wherein each side wall of the basket has a support projecting into the basket and adapted to engage the tray with the tray resting on the supports so as to stabilize the tray when positioned in the usage position.

7. The shopping cart of claim 1 wherein the hinge aperture is one of two hinge apertures, which are similar to each other and which are spaced laterally from each other.

8. The shopping cart of claim 7 wherein the tray is formed from welded steel wires, which include two elongate loops, each defining one of the hinge apertures.

* * * * *